United States Patent
Chen et al.

(10) Patent No.: US 7,381,077 B2
(45) Date of Patent: Jun. 3, 2008

(54) CONNECTOR MODULE

(75) Inventors: Wen-Hsin Chen, Taoyuan Hsien (TW); Chih-Hslao Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 157 days.

(21) Appl. No.: 11/368,436

(22) Filed: Mar. 7, 2006

(65) Prior Publication Data
US 2006/0281357 A1    Dec. 14, 2006

(30) Foreign Application Priority Data
Jun. 10, 2005    (TW) .............................. 94119252 A

(51) Int. Cl.
*H01R 6/27* (2006.01)
(52) U.S. Cl. ....................................... 439/350
(58) Field of Classification Search ........ 439/350–353; 385/88–92
See application file for complete search history.

(56) References Cited

U.S. PATENT DOCUMENTS

| | | | | |
|---|---|---|---|---|
| 5,338,227 | A * | 8/1994 | Nakamura | .................. 439/607 |
| 5,767,999 | A * | 6/1998 | Kayner | ....................... 398/164 |
| 6,299,362 | B1 * | 10/2001 | Gilliland et al. | .............. 385/92 |
| 6,439,918 | B1 * | 8/2002 | Togami et al. | .............. 439/372 |
| 6,744,963 | B2 * | 6/2004 | Hwang | ......................... 385/92 |
| 6,805,574 | B2 * | 10/2004 | Huang | ......................... 439/357 |
| 6,884,097 | B2 * | 4/2005 | Ice | ............................. 439/353 |
| 6,908,323 | B2 * | 6/2005 | Ice | ............................. 439/353 |

* cited by examiner

*Primary Examiner*—Briggitte R. Hammond
(74) *Attorney, Agent, or Firm*—Birch, Stewart, Kolasch & Birch, LLP

(57) ABSTRACT

A connector module for communication includes a main body, a slider, a holder, a protrusion and an elastic member. The slider is telescoped into the protrusion and connected with the holder. The holder slides the slider, enabling the protrusion to move in and out from the main body, so that the main body can be detachably assembled with a casing.

20 Claims, 5 Drawing Sheets

CONNECTOR MODULE

BACKGROUND

The invention relates to a connector module, and in particular, to a connector module specified under the X2 multi source agreement (X2 MSA).

In connector systems, especially for fiber-optic communication network, an optical transceiver module functions as a connecting interface between the host and the transmission line. In practice, it is desired that the optical transceiver module can utilize minimal space to attain a maximum connection number. Additionally, the optical transceiver module should be able to provide hot swapping, i.e. exchanging or replacing modules without shutting down the host. To meet functional requirements and establish the uniform specifications of modules, a consortium of top-tier optical component suppliers announced X2, a multi source agreement (MSA) for smaller-form-factor 10 Gbit/s pluggable transceivers.

According to the MSA, modules should have the same physical sizes; therefore, all suppliers are devoted to simplifying the inner structure and mechanism of the module and minimizing manufacturing process to achieve easy fabrication and lower costs.

SUMMARY

The objective of the invention is to provide a connector module in which inner structure is simplified so as to minimize the manufacturing process and reduce costs. Furthermore, because a main body of the module can be easily attached with and detached from a casing of the module, a user can assemble or dissemble the module with minimal force.

Accordingly, a slider is engaged with a holder which connects to a main body. The slider is telescoped into a protrusion. When the force is applied to the holder, the holder indirectly drives, through the slider, the protrusion to move in or out from the main body, so that the main body can be detachably assembled with a casing by the protrusion.

DESCRIPTION OF THE DRAWINGS

The invention can be more fully understood by reading the subsequent detailed description and examples with references made to the accompanying drawings, wherein.

DETAILED DESCRIPTION

The invention provides a connector module utilizing a movable holder to enable a protrusion sliding in and out from a main body, so that the main body can be detachably assembled with a casing.

Figure 1A:
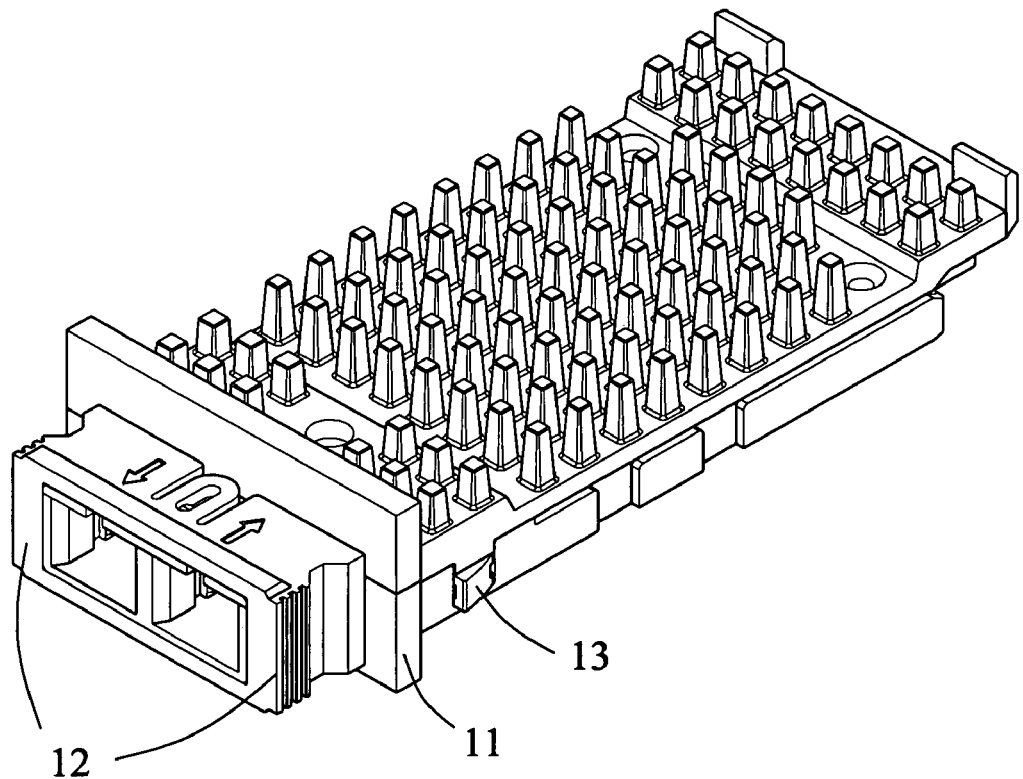
FIG. 1A is a schematic diagram of a connector module of a first embodiment of the invention.

FIG. 1A depicts a connector module of a first embodiment of the invention. The connector module is an optical transceiver module 100, comprising a main body 11, a movable holder 12, and a protrusion 13. By moving the holder 12, the protrusion 13 can slide in or out from the main body 11.

Figure 1B:
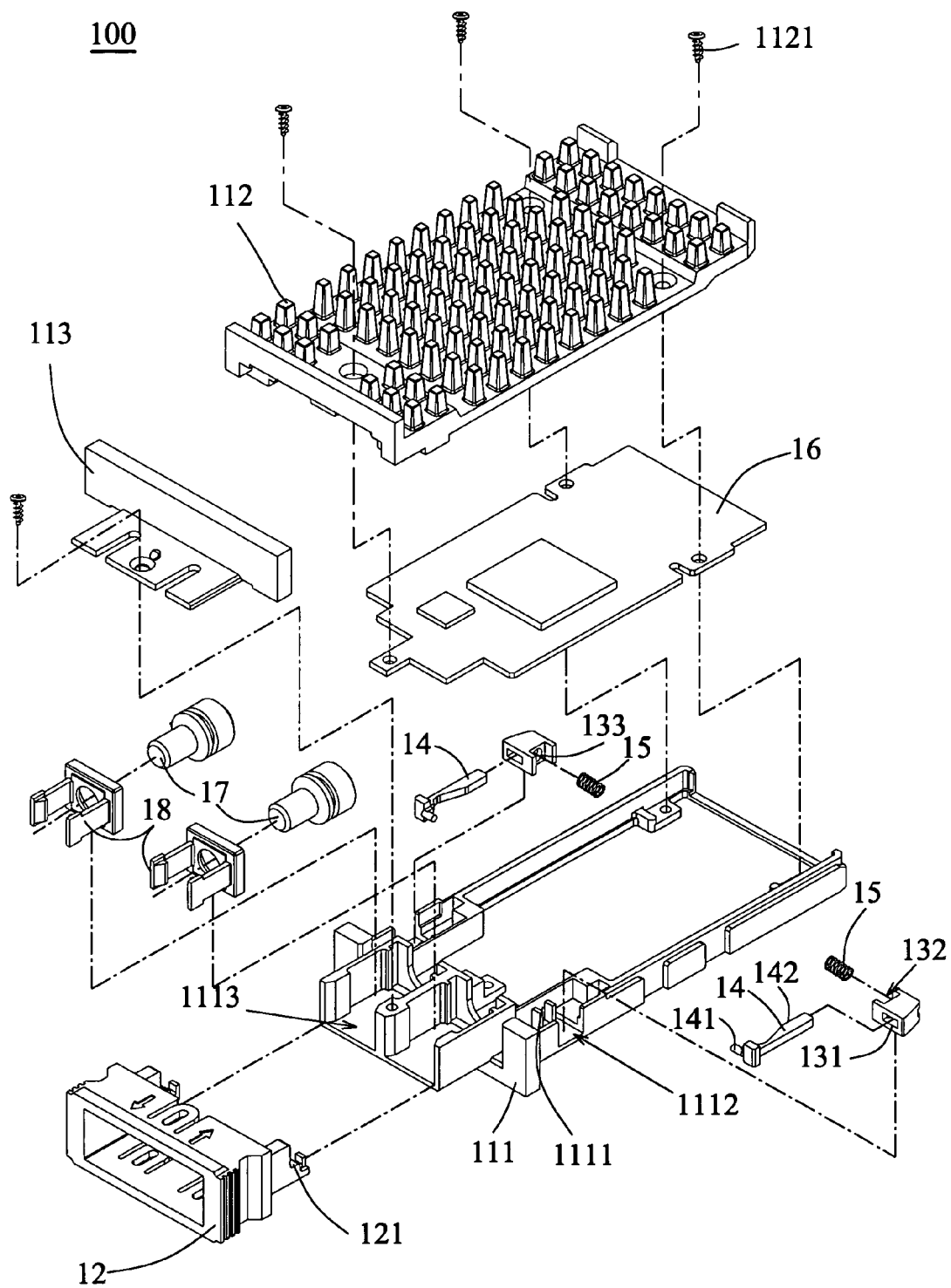
FIG. 1B is an exploded view of the connector module in FIG. 1A.

FIG. 1B is an exploded view of the connector module in FIG. 1A. The optical transceiver module 100 further comprises a slider 14, an elastic member 15, a controller 16, at least one photoelectric transceiver 17, and at least one gripper 18. The main body 11 comprises a base 111, a first cover 112, and a second cover 113. To assemble the module, the photoelectric transceivers 17 and the grippers 18 are placed in the base 111 successively. The second cover 113 connects with the base 111 to define a through hole 1113. The holder 12 telescopes in the through hole 1113 to connect with the main body 11. Next, the slider 14 telescopes in a hole 131 of the protrusion 13, and both of the slider 14 and protrusion 13 are positioned on the base 111. The slider 14 comprises an engaging portion 141 engaging with an engaging notch 121 of the holder 12, such that the holder 12 drives the slider 14 to slide. The base 111 further comprises a notch 1111, and the protrusion 13 further comprises a depression 132 corresponding to the notch 1111. Between the notch 1111 and the depression 132, a space 1112 for receiving the elastic member 15 is defined. Specifically, an end of the elastic member 15 abuts the bottom of the notch 1111, and another end of the elastic member 15 abuts a recess 133 formed in the depression 132 of the protrusion 13. Thus, when a force is applied to the holder 12, a sloped surface 142 of the slider 14 shifts the position of the protrusion 13 and the elastic member 15, to change the distance between the notch 1111 and the depression 132. After connecting the controller 16 with the photoelectric transceivers 17, the first cover 112 connects with the base 111. In this embodiment, the first cover 112 and the base 111 are connected by screws 19, but it is not limited thereto.

Material of the slider 14 and the protrusion 13 can be selected from plastics, metal, alloy, stainless steel, or ceramic; and the elastic member 15 can be a spring.

Figure 1C:
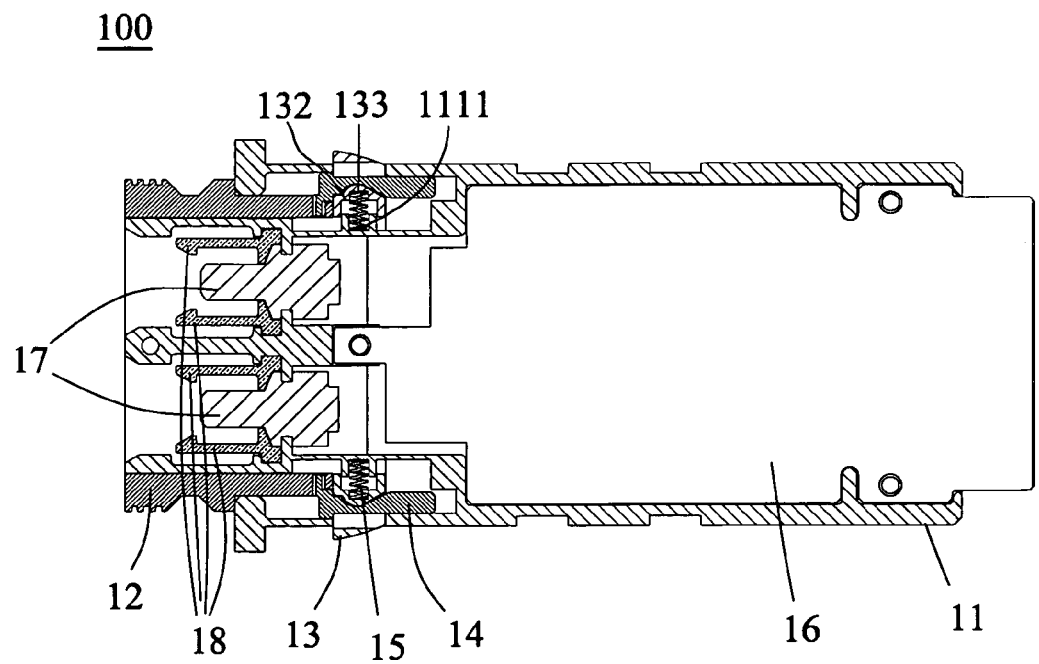
FIGS. 1C-1D are sectional views of the connector module in FIG. 1A.
Figure 1D:
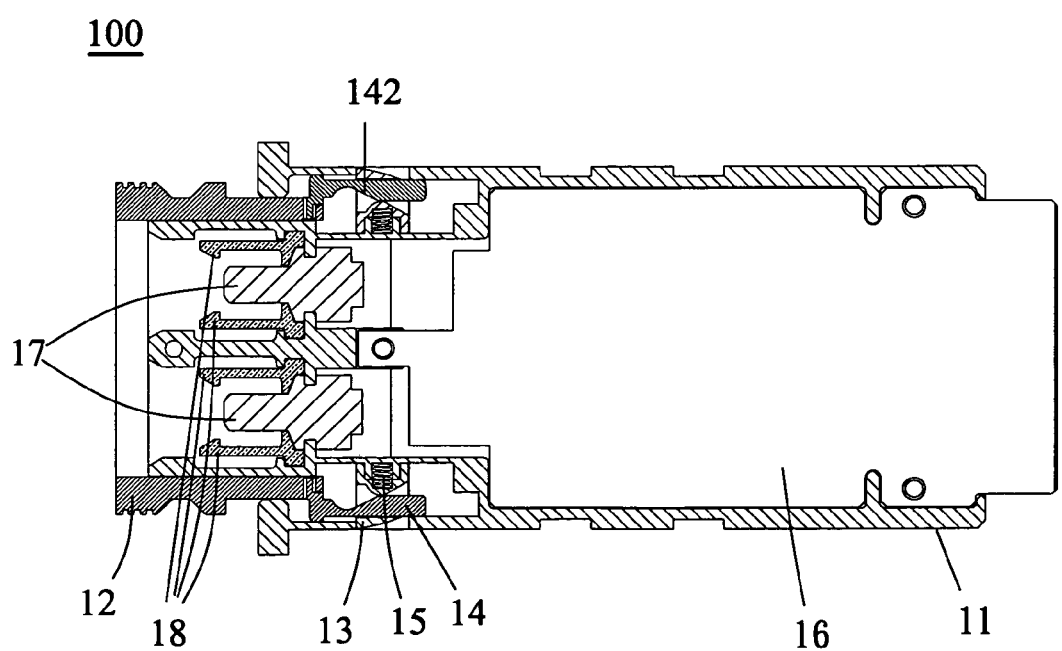

FIGS. 1C and 1D are sectional views of the connector module 100. Referring to FIG. 1C, when the holder 12 is in a first position, the protrusion 13 extends out of the main body 11. Referring to FIG. 1D, when a force is outward applied to the holder 12, the holder 12 will drive the slider 14 to slide and simultaneously the slider will compress the elastic member 15 through the sloped surface 142 of the slider 14. As a result, the distance between the notch 1111 and the depression 132 changes to make the protrusion 13 within the main body 11, wherein the holder 12 is in a second position.

Figure 2A:
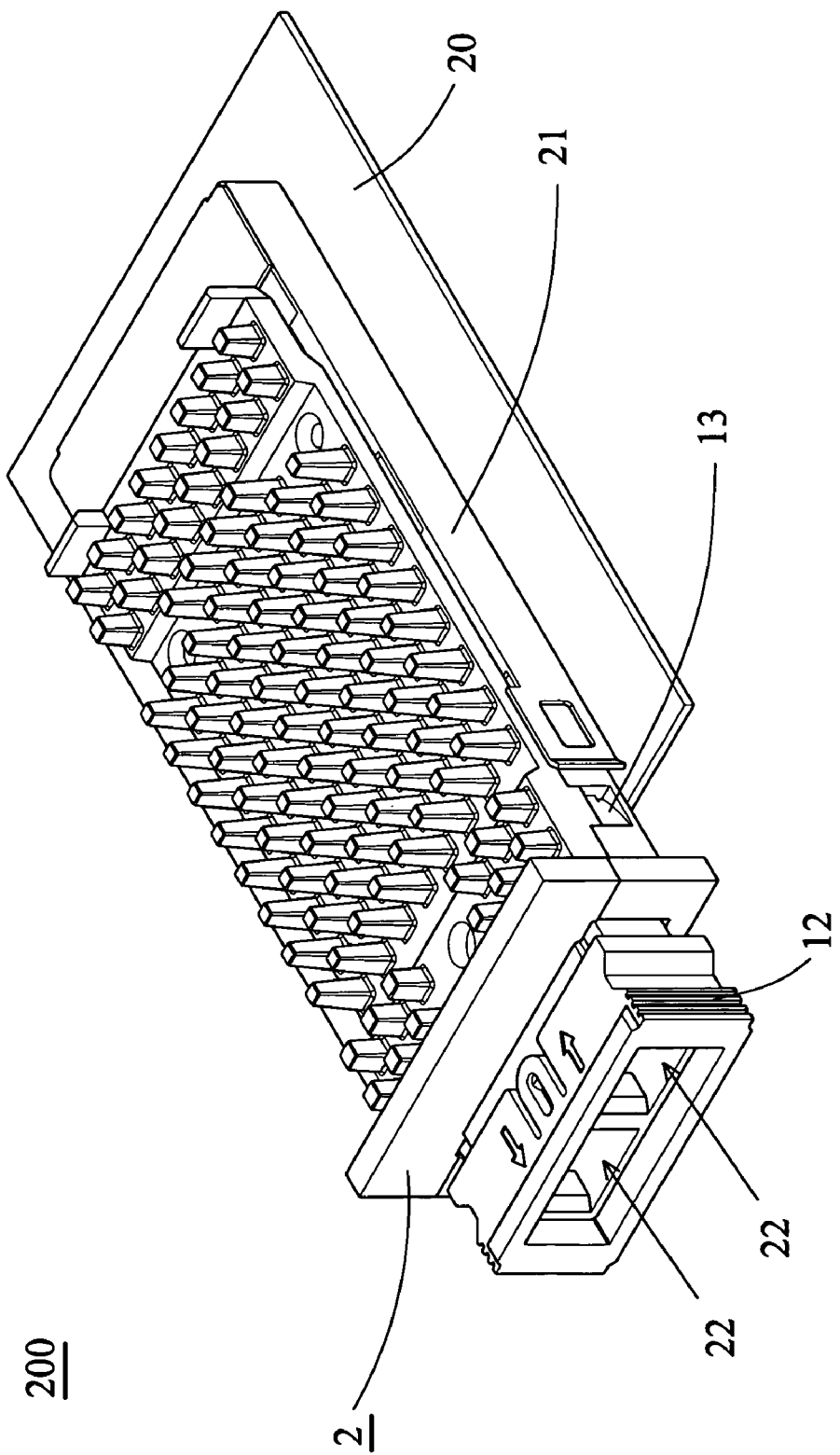
FIGS. 2A-2B are schematic diagrams of a connector module of a second embodiment of the invention.
Figure 2B:
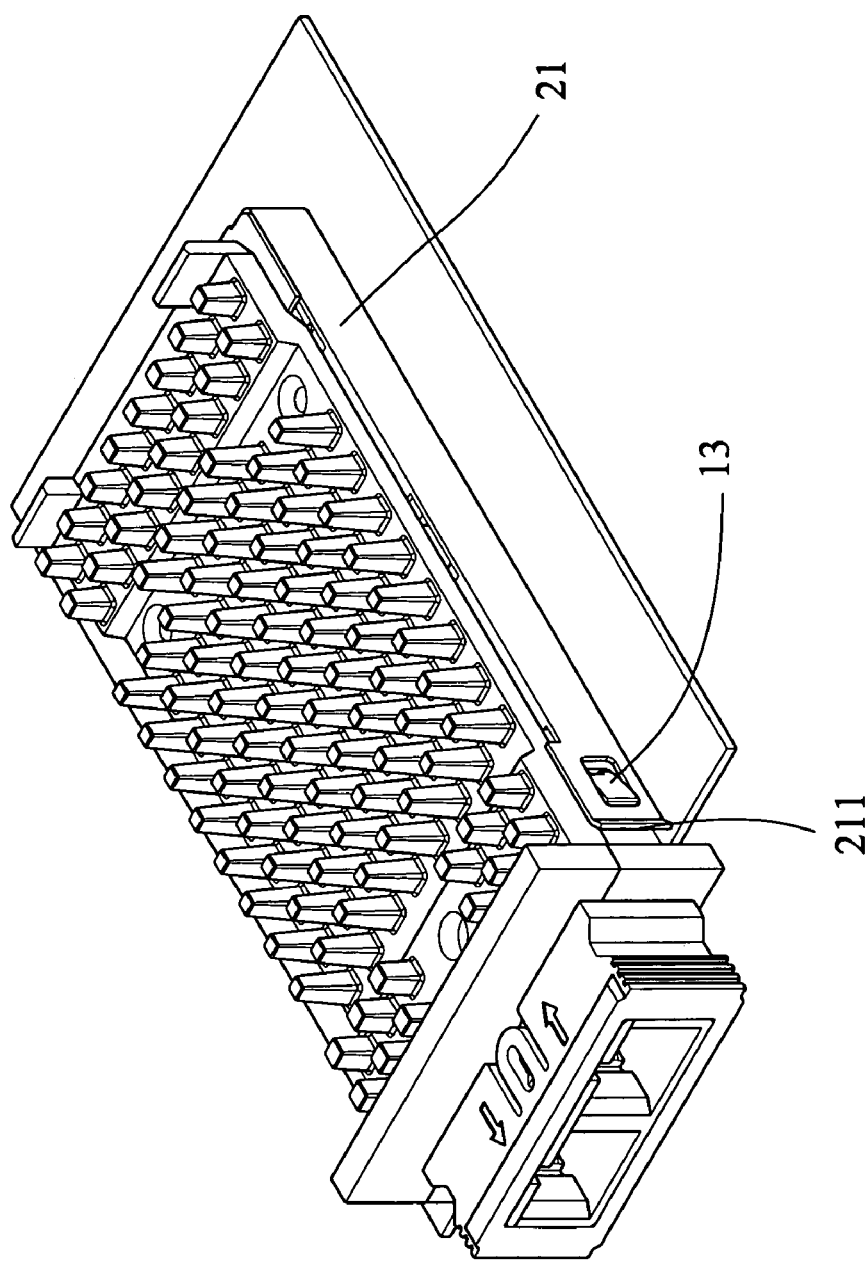

FIGS. 2A and 2B depict a connector module of a second embodiment. The connector module is an optical transceiver module 200. In this embodiment, same elements are referenced the same as those in the first embodiment. The difference from the first embodiment is that the optical transceiver module 200 further comprises at least one controller 20, for example a printed circuit board) and a casing 21. The casing 21 comprises an opening 211 for receiving the main body 11. In more detail, the main body 11 is provided with at least one receiving hole 22 which is engaged with a plug of an externally device (not shown in the figure). Referring to FIG. 2A, when the holder 12 is in the second position, the protrusion 13 does not extend out of the main body 11 and accordingly the main body 11 can move in or out from the casing 21. Referring to FIG. 2B, when the holder 12 is in the first position, the protrusion 13 extends out of the main body 11 where the main body 11 is connected with the casing 21 and electrically coupled to the printed circuit board 20. By the movement of the holder 12 and protrusion 13, the main body 11 and the casing 21 are able to be combined or separated with each other.

The connector module of the invention can be an optical transceiver module or an electrical transceiver module.

Additionally, the connector module of the invention includes either a single casing or a plurality of casings to be connected to an external printed circuit board.

The connector module simplifies the internal structure and accordingly simplifies manufacturing process and reduces costs. Furthermore, because a main body of the module can be easily attached with and detached from a casing of the module, a user can assemble or dissemble the module with minimal force.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A connector module comprising:
   a main body;
   a slider disposed in the main body;
   a holder connected with the main body for sliding the slider;
   a protrusion connected with the slider; and
   an elastic member abutting the protrusion;
   wherein the protrusion moves between an interior and an exterior of the main body by movement of the holder.

2. The connector module as claimed in claim 1, wherein the slider comprises a first engaging portion, and the holder comprises a second engaging portion engaging with the first engaging portion for sliding the slider.

3. The connector module as claimed in claim 1, wherein the protrusion comprises a hole for receiving the slider.

4. The connector module as claimed in claim 1, wherein the main body comprises a notch, and the protrusion comprises a depression corresponding to the notch to define a space for receiving the elastic member.

5. The connector module as claimed in claim 4, wherein an end of the elastic member abuts the bottom of the notch, and another end of the elastic member abuts the protrusion.

6. The connector module as claimed in claim 5, wherein the protrusion further comprises a recess abutting the elastic member.

7. The connector module as claimed in claim 4, wherein the slider has a sloped surface for shifting the position of the protrusion so as to change a distance between the notch and the depression.

8. The connector module as claimed in claim 1, wherein when the holder is in a first position, the protrusion is exposed to the exterior of the main body, and when the holder is in a second position, the protrusion is not exposed to the exterior of the main body.

9. The connector module as claimed in claim 1, wherein the main body further comprises a controller in the interior of the main body.

10. The connector module as claimed in claim 1, further comprising a casing having an opening for receiving the main body, the main body and the casing being attached or detached by the protrusion.

11. The connector module as claimed in claim 1, wherein the connector module is an electrical transceiver module or an optical transceiver module.

12. The connector module as claimed in claim 1, wherein the main body comprises at least one through hole for receiving the holder.

13. The connector module as claimed in claim 1, wherein the slider and the protrusion are made of plastics, metal, alloy, stainless steel, or ceramic.

14. The connector module as claimed in claim 1, wherein the elastic member is a spring.

15. A connector module comprising:
    a main body comprising at least one controller and at least one receiving hole for receiving a plug corresponding to the main body;
    a casing comprising an opening for receiving the main body;
    a slider disposed in the main body;
    a holder connected with the main body for sliding the slider;
    a protrusion connected with the slider; and
    an elastic member abutting the protrusion;
    wherein the protrusion moves between an interior and an exterior of the main body by movement of the holder to allow the casing to be attached with or detached from the main body.

16. The connector module as claimed in claim 15, wherein the slider comprises a first engaging portion, and the holder comprises a second engaging portion engaging with the first engaging portion for sliding the slider.

17. The connector module as claimed in claim 15, wherein the protrusion comprises a hole for receiving the slider.

18. The connector module as claimed in claim 15, wherein the main body comprises a notch, the protrusion comprises a depression corresponding to the notch to define a space for receiving the elastic member, wherein an end of the elastic member abuts the bottom of the notch, and another end of the elastic member abuts the protrusion.

19. The connector module as claimed in claim 18, wherein the slider has a sloped surface for shifting the position of the protrusion to change a distance between the notch and the depression.

20. The connector module as claimed in claim 16, wherein the main body comprises at least one through hole for receiving the holder.

\* \* \* \* \*